United States Patent
Zorn et al.

(10) Patent No.: US 10,604,685 B2
(45) Date of Patent: Mar. 31, 2020

(54) AQUEOUS POLYMER DISPERSIONS FOR COMPOSITE FILM LAMINATION

(71) Applicant: BASF SE, Ludwigshafen (DE)

(72) Inventors: Matthias Zorn, Heppenheim (DE); Karl-Heinz Schumacher, Neustadt (DE)

(73) Assignee: BASF SE, Ludwigshafen (DE)

( * ) Notice: Subject to any disclaimer, the term of this patent is extended or adjusted under 35 U.S.C. 154(b) by 81 days.

(21) Appl. No.: 15/565,433

(22) PCT Filed: Apr. 13, 2016

(86) PCT No.: PCT/EP2016/058059
§ 371 (c)(1),
(2) Date: Oct. 10, 2017

(87) PCT Pub. No.: WO2016/169819
PCT Pub. Date: Oct. 27, 2016

(65) Prior Publication Data
US 2018/0118985 A1    May 3, 2018

(30) Foreign Application Priority Data

Apr. 23, 2015 (EP) .................................. 15164771

(51) Int. Cl.
| | | |
|---|---|---|
| *C09J 151/00* | (2006.01) | |
| *B32B 27/08* | (2006.01) | |
| *B32B 27/12* | (2006.01) | |
| *C09D 151/00* | (2006.01) | |
| *B32B 7/12* | (2006.01) | |
| *C08F 265/06* | (2006.01) | |
| *C08L 51/00* | (2006.01) | |

(52) U.S. Cl.
CPC ............ *C09J 151/003* (2013.01); *B32B 7/12* (2013.01); *B32B 27/08* (2013.01); *C08F 265/06* (2013.01); *C08L 51/003* (2013.01); *C09D 151/003* (2013.01); *B32B 2255/10* (2013.01); *B32B 2255/26* (2013.01); *C08L 2201/54* (2013.01)

(58) Field of Classification Search
CPC ......................... C09J 151/003; C09J 153/00
See application file for complete search history.

(56) References Cited

U.S. PATENT DOCUMENTS

| | | |
|---|---|---|
| 4,474,923 A | 10/1984 | Keskey et al. |
| 5,300,602 A | 4/1994 | Arita et al. |
| 2008/0293885 A1 | 11/2008 | Morimoto et al. |
| 2016/0122597 A1 | 5/2016 | Xiao et al. |

FOREIGN PATENT DOCUMENTS

| | | |
|---|---|---|
| EP | 0 176 609 A1 | 4/1986 |
| EP | 0 846 731 A2 | 6/1998 |
| WO | WO 2006/112538 A1 | 10/2006 |
| WO | WO 2008/102816 A1 | 8/2008 |
| WO | WO 2011/154920 A1 | 12/2011 |
| WO | WO 2014/187692 A1 | 11/2014 |

OTHER PUBLICATIONS

Schmidt et al., "Water-based non-stick hydrophobic coatings," Nature, vol. 368, pp. 39-41 (Year: 1994).*
International Search Report and Written Opinion dated Jul. 8, 2016 in PCT/EP2016/058059 (with English translation of the Search Report).

* cited by examiner

*Primary Examiner* — Ramsey Zacharia
(74) *Attorney, Agent, or Firm* — Oblon, McClelland, Maier & Neustadt, L.L.P.

(57) ABSTRACT

Described are aqueous polymer dispersions for composite film lamination, comprising a dispersed polymer and a dissolved polymer, and also a multistage process for preparing them from ethylenically unsaturated, radically polymerizable monomers. In a first stage, a first polymer is prepared by radical emulsion polymerization. In a second stage, an aqueous polymer dispersion is prepared in the presence of the first polymer. The monomers of the first stage comprise monomers with acid groups. The dissolved polymer comprises monomers having oxazoline groups, and also water-soluble monomers. The aqueous polymer dispersions can be used as adhesive for producing composite films.

20 Claims, No Drawings

US 10,604,685 B2

AQUEOUS POLYMER DISPERSIONS FOR COMPOSITE FILM LAMINATION

CROSS-REFERENCE TO RELATED APPLICATIONS

This application is a National Stage of PCT/EP2016/058059, which was filed on Apr. 13, 2016. This application is based upon and claims the benefit of priority to European Application No. 15164771.6, which was filed on Apr. 23, 2015.

The invention relates to aqueous polymer dispersions for composite film lamination comprising a dispersed polymer and a dissolved polymer, and to a multistage process for preparing the dispersed polymer. In a first stage, a first polymer is prepared by radical emulsion polymerization. In a second stage, an aqueous polymer dispersion is prepared in the presence of the first polymer. The monomers of the first stage comprise monomers with acid groups. The dissolved polymer comprises monomers having oxazoline groups and also water-soluble monomers. The aqueous polymer dispersions can be used as adhesives for producing composite films.

Laminating adhesives for composite film lamination, based on aqueous polymer dispersions, generally require a crosslinker in order to obtain an increase in the chemical resistance or the heat stability. Frequently for this purpose the laminating adhesive dispersions are formulated using isocyanate crosslinkers. Disadvantages are that these formulations have a relatively low working time (known as pot life) and may be objectionable on health grounds. Generally speaking, moreover, conventional aqueous polymer dispersions require relatively high quantities of emulsifier in order to stabilize the dispersion. A disadvantage is that high quantities of emulsifier may lower the instantaneous tack of aqueous laminating adhesive formulations. Polymer mixtures with nonwater-soluble polymers comprising oxazoline groups are described in EP 0176609, U.S. Pat. No. 4,474,923 and EP 0846731. These polymer dispersions include relatively large quantities of emulsifier, a disadvantage for composite film laminating adhesive applications. Polymer dispersions for composite film lamination without oxazoline monomers are described in WO 2011/154920. Emulsifier-free polymer dispersions produced by a multistage method, for protective film applications, are described in WO 2014/187692. Water-soluble polymers comprising oxazoline groups are described in U.S. Pat. No. 5,300,602.

The object was to provide aqueous polymer dispersions for composite film lamination that have an extremely long pot life, an extremely low level of objectionability on health grounds, and the capacity to be used for producing composite films having extremely good chemical resistance, extremely good instantaneous adhesion, and extremely good heat stability.

It has been found that the object can be achieved by the polymer dispersions described below. The invention provides an aqueous polymer dispersion for composite film lamination, comprising (A) at least one dispersed polymer A prepared by radical emulsion polymerization,
  where initially in a first stage in aqueous medium a first polymer dispersed in water is prepared by radical emulsion polymerization, the first polymer being prepared from a first composition comprising ethylenically unsaturated radically polymerizable monomers, where the monomers of the first stage comprise at least one monomer having at least one acid group in an amount of at least 0.1 part by weight, based on 100 parts by weight of the total amount of monomers of the first and second stages, and
  subsequently in a second stage a polymer dispersion is prepared in aqueous medium and in the presence of the first polymer by radical emulsion polymerization of a second composition comprising ethylenically unsaturated, radically polymerizable monomers, different from the first composition,
  where in total less than 0.5 part by weight of emulsifier, based on 100 parts by weight of monomers of the polymer (A), or no emulsifier is used, and
  where the glass transition temperature of the polymer (A) prepared is less than 0° C.; and
(B) at least one polymer B, in solution in the aqueous polymer dispersion and prepared by radical polymerization of
  (b1) at least one ethylenically unsaturated, radically polymerizable monomer having at least one oxazoline group, and
  (b2) at least 5% by weight, preferably at least 10% by weight, based on the total monomer amount of the polymer B, of at least one hydrophilic, ethylenically unsaturated, radically polymerizable monomer without oxazoline group and with a water solubility of at least 100 g/l, preferably at least 200 g/l and more preferably at least 300 g/l at 25° C.,
  and optionally further monomers (b3).

The fraction of the water-soluble monomers (b2) in the polymer B is preferably less than 50% by weight, based on the total amount of the monomers in the polymer B.

The expression "water-soluble" in the sense of the present invention refers to a solubility in water on the part of the substance in question of at least 100 g/l, preferably at least 200 g/l, and more preferably at least 300 g/l. The skilled person is aware that the water solubility of substances is dependent on the pH and on the temperature. The water solubility in the sense of the present invention refers to room temperature (25° C.) and to the maximum attainable solubility in water. In particular, the term "water-soluble" also encompasses alkali-soluble solutions of water-soluble monomers with acid groups—in other words, the presence of the monomers as dispersions in the acidic pH range, and their dissolution in water only in the alkaline pH range. In particular, the term "water-soluble" should be understood to mean that homogeneous, clear, aqueous phases are obtained.

The invention also provides a corresponding process for preparing aqueous polymer dispersions. The process described encompasses the preparation of polyacrylate dispersions in particular for application in composite film lamination, by a specially adapted, so-called one-pot process, which is based on the stabilization of emulsion polymers by protective colloids formed "in situ", i.e., immediately before or during the emulsion polymerization.

The dispersed polymer A, or the dispersed polymer A and the dissolved polymer B, preferably comprise no amino groups.

The molar ratio of acid groups in the polymer A to oxazoline groups in the polymer B is preferably from 20:1 to 1:1, more preferably from 10:1 to 2:1.

The weight ratio of polymer A to polymer B is preferably from 5:1 to 50:1, more preferably from 10:1 to 30:1.

The principle of the process of the invention is based on the preferably seed-controlled formation of small polymer particles in aqueous dispersion in a first polymerization stage by radical polymerization of a first monomer composition comprising at least one ethylenically unsaturated monomer having at least one acid group (e.g., a mixture of alkyl (meth)acrylate and (meth)acrylic acid) and also subsequent neutralization, and subsequent feeding of the principal monomers—of a mixture of alkyl (meth)acrylates, and optionally styrene and further acid monomers, for example. Following neutralization, the particles formed in the first stage are able to dissolve and as protective colloids to stabilize the polymer dispersion of the invention. At the beginning of the reaction of the first stage, the pH in the reaction vessel falls continually as a result of continuous addition of acid. As a result of this, the polymer particles formed in the first polymerization stage are in undissolved form. Only on neutralization (e.g., by addition of ammonia) before or during the second polymerization stage do the polymer particles formed initially pass into solution and therefore constitute protective colloids, which are able to act as dispersion-stabilizing protective colloids in the emulsion polymerization that ensues on addition of the principal monomers, since these colloids are composed preferably of nonpolar alkyl (meth)acrylate units and polar (meth)acrylic acid units. The polymerization of the first stage takes place preferably at a pH of less than 5 and, before or during the polymerization of the second stage, the acid groups of the first polymer are neutralized with a volatile base to an extent such that the pH of the polymer dispersion at the end of the second stage is greater than 5. An example of a preferred volatile base is ammonia, in the form of an aqueous ammonia solution, for example.

The invention also provides the use of the aqueous polymer dispersions of the invention as a laminating adhesive, for producing laminating adhesives, or in the production of composite films; corresponding composite films; and also a corresponding process for producing composite films, which involves providing an aqueous polymer dispersion of the invention and bonding at least two films with one another using the aqueous polymer dispersion.

In the text below, there is occasional use of the designation "(meth)acryl . . . ", and similar designations, as an abbreviated notation for "acryl . . . or methacryl . . . ". In the designation Cx alkyl (meth)acrylate and analogous designations, x denotes the number of C atoms in the alkyl group.

The glass transition temperature is determined by differential scanning calorimetry (ASTM D 3418-08, midpoint temperature). The glass transition temperature of the polymer in the polymer dispersion is the glass transition temperature obtained on evaluation of the second heating curve (heating rate 20° C./min).

The stated solubilities, water solubilities for example, are measured under standard conditions, at a temperature of 25° C. and under a pressure of 1013 mbar. The solubilities of the monomers are determined by dropwise introduction of monomer into deionized water until a visually perceptible phase boundary develops.

Dispersed Polymer (A)

The dispersed polymer (A) is obtainable by radical emulsion polymerization of ethylenically unsaturated compounds (monomers). The polymerization both of the first stage and also of the second stage takes place preferably with no emulsifier or with little emulsifier in the sense that no emulsifier is added to stabilize the polymer dispersion of the invention. Emulsifiers are nonpolymeric, amphiphilic, surface-active substances that are added to the polymerization mixture. Small amounts of emulsifiers, present as a result, for example, of the use of emulsifier-stabilized polymer seed, are not detrimental. A total of less than 0.5 part by weight, more particularly less than 0.4 part by weight, less than 0.3 part by weight, based on 100 parts by weight of monomers of the polymer dispersion, or no emulsifier is used. In particular there is preferably no reactive emulsifier—that is, copolymerizable emulsifier—used either.

In the first stage a polymer is prepared from monomers which comprise at least one monomer having at least one acid group, in an amount of at least 0.1 part by weight, preferably from 1 to 10 parts by weight, based on 100 parts by weight of the total amount of first- and second-stage monomers. Preferably, in the first stage, monomers containing acid groups (acid monomers) are copolymerized with monomers without acid groups, more particularly nonionic monomers. The weight ratio of monomers containing acid groups to monomers without acid groups in the monomer mixture of the first polymerization stage is preferably in the range from 0.5:99.5 to 30:70, preferably from 1:99 to 20:80 or from 5:95 to 15:85.

At low pH levels of 2 to 3, for example, and with nonneutralized acid groups, the polymer of the first stage is not water-soluble, but is dispersed in water. If neutralizing agent is added before the polymerization of the second stage, there is an increase, with increasing degree of neutralization of the acid groups, in the water solubility of the polymer of the first stage. With increasing water solubility, the polymer of the first stage is able to act as a protective colloid for the polymer of the second stage and is able to stabilize the polymer dispersion with high polymer solids content. Protective colloids are polymeric compounds which, on solvation, bind large amounts of water and are capable of stabilizing dispersions of water-insoluble polymers. In contrast to emulsifiers, they generally do not lower the interfacial tension between polymer particles and water. The number-average molecular weight of the protective colloids is preferably above 1000 g/mol, more particularly above 2000 g/mol, and preferably up to 50 000 g/mol or up to 10 000 g/mol, as for example from 1000 to 100 000 g/mol, from 1000 to 10 000 g/mol or from 2000 to 10 000 g/mol.

The polymers of the first stage that become effective as protective colloids on neutralization are used preferably in an amount of 1% to 60% or of 5% to 50% by weight, or of 7% to 40% by weight or of 10% to 30% by weight (particularly when the total solids content of the polymer dispersion of the invention is more than 50% by weight), based on 100% by weight of the monomers to be polymerized in all stages.

The acid groups of the polymer of the first stage are neutralized partially or completely with suitable bases. It is preferred to use volatile bases, more particularly volatile organic bases, or ammonia. Ammonia is used preferably in the form of aqueous ammonia solution. Volatile bases and volatile amines are preferably those having a boiling point of below 60° C., preferably below 20° C., under atmospheric pressure.

Monomers with acid groups (acid monomers) are used in an amount of at least 0.1 part by weight and preferably less than 5 parts by weight per 100 parts by weight of monomers—for example, from 0.1 to 4 parts by weight. Acid monomers are ethylenically unsaturated acid monomers, examples being ethylenically unsaturated carboxylic acids, and vinylphosphonic acid and. Ethylenically unsaturated carboxylic acids used are preferably alpha,beta-monoethylenically unsaturated monocarboxylic and dicarboxylic acids having 3 to 6 C atoms in the molecule. Examples of such acids are acrylic acid, methacrylic acid, itaconic acid, maleic acid, fumaric acid, crotonic acid, vinylacetic acid and vinyllactic acid. Preference is given to itaconic acid, acrylic acid and methacrylic acid and a mixture thereof, particular preference to itaconic acid and acrylic acid.

The acid monomers used in the first stage can be copolymerized in the first stage with monomers without acid group. The polymer of the first stage is preferably formed from at least 40% by weight of nonionic principal monomers, defined in more detail below, and also from a second kind of monomer, selected from ethylenically unsaturated acid monomers. The polymer of the first stage may, furthermore, optionally be formed from further, preferably nonionic, monomers. The polymer of the first stage is preferably constructed of at least 40%, more particularly of 40% to 80% or of 50% to 80%, by weight of principal monomers which are selected from the group consisting of $C_1$ to $C_{20}$ alkyl (meth)acrylates, vinyl esters of carboxylic acids comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms and one or two double bonds, and mixtures of these monomers. Principal monomers for the polymer of the first stage are, for example, (meth)acrylic acid alkyl esters with a $C_1$-$C_{10}$ alkyl radical, such as methyl methacrylate, methyl acrylate, n-butyl acrylate, ethyl acrylate, and 2-ethylhexyl acrylate. Also suitable in particular are mixtures of the (meth)acrylic acid alkyl esters. Vinyl esters of carboxylic acids having 1 to 20 C atoms are, for example, vinyl laurate, vinyl stearate, vinyl propionate, Versatic acid vinyl esters, and vinyl acetate. Vinylaromatic compounds contemplated include vinyltoluene, alpha- and para-methylstyrene, alpha-butylstyrene, 4-n-butylstyrene, 4-n-decylstyrene, and, preferably, styrene. Examples of nitriles are acrylonitrile and methacrylonitrile. The vinyl halides are ethylenically unsaturated compounds substituted by chlorine, fluorine or bromine, preferably vinyl chloride and vinylidene chloride. Vinyl ethers include, for example, vinyl methyl ether and vinyl isobutyl ether. Vinyl ethers of alcohols comprising 1 to 4 C atoms are preferred. As hydrocarbons having 4 to 8 C atoms and two olefinic double bonds, mention may be made of butadiene, isoprene, and chloroprene. Preferred as principal monomers for the polymer of the first stage are the $C_1$ to $C_{10}$ alkyl acrylates and methacrylates, more particularly $C_1$ to $C_8$ alkyl acrylates and methacrylates.

With very particular preference the polymer of the first stage (apart from the acid monomers) is what is called a straight acrylate, meaning that it is formed, apart from the acid monomers, exclusively from (meth)acrylic acid derivatives (e.g., the esters thereof).

In one preferred embodiment, the polymer of the first stage is a copolymer which
(i) is used in an amount of 5% to 40% by weight, based on 100 parts by weight of the total monomers to be polymerized in first and second stages,
(ii) is composed of at least 50% by weight and up to 99.9% by weight of principal monomers which are selected from the group consisting of C1 to C10 alkyl (meth)acrylates and mixtures of these monomers, and
(iii) is composed of at least 0.1% by weight and up to 15% by weight of ethylenically unsaturated acid monomers, which are preferably selected from acrylic acid, methacrylic acid, itaconic acid, and a mixture thereof.

One embodiment of the invention uses at least one chain transfer agent in the polymerization of the first stage. By means of such an agent it is possible to reduce the molar mass of the emulsion polymer, by a chain termination reaction. The agents are attached in the process to the polymer, generally to the chain end. The amount of the agents is in particular 0.05 to 4 parts by weight, more preferably 0.05 to 0.8 part by weight, and very preferably 0.1 to 0.6 part by weight, based on 100 parts by weight of the monomers to be polymerized. Examples of suitable agents include compounds having a thiol group such as tert-butyl mercaptan, thioglycolic acid ethylhexyl ester, mercaptoethanol, mercaptopropyltrimethoxysilane or tert-dodecyl mercaptan. The agents are generally low molecular weight compounds with a molar weight of less than 2000, more particularly less than 1000, g/mol.

In one preferred embodiment of the invention, the polymerization of the first stage takes place in the presence of seed latex. Seed latex is an aqueous dispersion of finely divided polymer particles having an average particle diameter of preferably 20 to 40 nm. Seed latex is used in an amount of preferably 0.05% to 5% by weight, more preferably of 0.1% to 3% by weight, based on the total monomer amount of first and second stages. A suitable latex, for example, is one based on polystyrene or based on polymethyl methacrylate. A preferred seed latex is polystyrene seed.

Preferably at least 60%, more preferably at least 80%, e.g., from 80% to 99.5%, more preferably at least 90%, by weight of the monomers used for the polymerization of the second stage comprise one or more of the principal monomers described below. The principal monomers are preferably selected from the group consisting of $C_1$-$C_{20}$ alkyl (meth)acrylates, vinyl esters of carboxylic acids comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms and one or two double bonds, or mixtures of these monomers.

Examples include (meth)acrylic acid alkyl esters with a $C_1$-$C_{10}$ alkyl radical, such as methyl methacrylate, methyl acrylate, n-butyl acrylate, ethyl acrylate, and 2-ethylhexyl acrylate. Also suitable in particular are mixtures of the (meth)acrylic acid alkyl esters. Vinyl esters of carboxylic acids having 1 to 20 C atoms are, for example, vinyl laurate, vinyl stearate, vinyl propionate, Versatic acid vinyl esters, and vinyl acetate. Vinylaromatic compounds contemplated include vinyltoluene, alpha- and para-methylstyrene, alpha-butylstyrene, 4-n-butylstyrene, 4-n-decylstyrene, and, preferably, styrene. Examples of nitriles are acrylonitrile and methacrylonitrile. The vinyl halides are ethylenically unsaturated compounds substituted by chlorine, fluorine or bromine, preferably vinyl chloride and vinylidene chloride. Vinyl ethers include, for example, vinyl methyl ether and vinyl isobutyl ether. Vinyl ethers of alcohols comprising 1 to 4 C atoms are preferred. As hydrocarbons having 4 to 8 C atoms and two olefinic double bonds, mention may be made of butadiene, isoprene, and chloroprene.

Preferred as principal monomers for the polymerization of the second stage are the $C_1$ to $C_{10}$ alkyl acrylates and methacrylates, more particularly $C_1$ to $C_8$ alkyl acrylates and methacrylates, and vinylaromatics, especially styrene, and mixtures thereof. Very particular preference is given to methyl acrylate, methyl methacrylate, ethyl acrylate, n-butyl acrylate, n-butyl methacrylate, n-hexyl acrylate, octyl acrylate, and 2-ethylhexyl acrylate, 2-propylheptyl acrylate, and mixtures of these monomers.

Besides the principal monomers, the monomers for the polymerization of the second stage may comprise further monomers, examples being monomers with carboxylic acid, sulfonic acid, or phosphonic acid groups. Carboxylic acid groups are preferred. Examples include acrylic acid, methacrylic acid, itaconic acid, maleic acid, or fumaric acid. Further monomers are, for example, also monomers comprising hydroxyl groups, especially $C_1$-$C_{10}$ hydroxyalkyl (meth)acrylates, and also (meth)acrylamide. Further monomers that may be mentioned are, moreover, phenyloxyethylglycol mono(meth)acrylate, glycidyl acrylate, glycidyl methacrylate, and amino (meth)acrylates such as 2-aminoethyl (meth)acrylate. Crosslinking monomers are further monomers that may also be mentioned. The monomers used in the second stage preferably comprise not more than 1 part by weight of monomers with acid groups, or no monomers with acid groups, e.g., from 0 to 1 part by weight or from 0.05 to 0.5 part by weight; based on the sum of first- and second-stage monomers.

In particular, the monomers for the polymerization of the second stage are selected to an extent of at least 60%, more preferably at least 80%, e.g., from 60% to 99.5%, and very preferably at least 95%, by weight, from at least one $C_1$ to $C_{20}$ alkyl (meth)acrylate.

Suitable monomers for the first and/or second polymerization stage are also, in particular, behenyl (meth)acrylate, cyclohexyl (meth)acrylate, 4-hydroxybutyl acrylate, isobutyl acrylate, tert-butyl (meth)acrylate, tert-butylaminoethyl methacrylate, ureidomethacrylate, and mixtures thereof.

The polymers of the first stage and of the second stage (apart from the acid monomers) are preferably straight acrylates, in other words polymers which apart from the acid monomers (e.g., (meth)acrylic acid and/or itaconic acid) are formed exclusively of derivatives of (meth)acrylic acid (e.g., the esters thereof).

The monomers of the polymerization of the second stage are preferably selected such that the glass transition temperature, calculated for a polymer prepared from the monomers of the second stage, is in the range from −45° C. to +15° C., more particularly from −40° C. to +5° C. By a controlled variation of the nature and amount of the monomers it is possible in accordance with the invention for the skilled person to prepare aqueous polymer compositions whose polymers have a glass transition temperature within the desired range. Guidance is possible by means of the Fox equation. According to Fox (T. G. Fox, Bull. Am. Phys. Soc. 1956 [Ser. II] 1, page 123, and in accordance with Ullmann's Encycloädie der technischen Chemie, Volume 19, page 18, 4th Edition, Verlag Chemie, Weinheim, 1980), the calculation of the glass transition temperature of copolymers is subject in good approximation to the following equation:

$$1/T_g = x^1/T_g^1 + x^2/T_g^2 + \ldots x^n/T_g^n,$$

where $x^1, x^2, \ldots x^n$ are the mass fractions of the monomers $1, 2, \ldots n$ and $T_g^1, T_g^2, \ldots T_g^n$ are the glass transition temperatures of the polymers synthesized in each case only from one of the monomers $1, 2, \ldots n$, in degrees Kelvin. The $T_g$ values for the homopolymers of the majority of monomers are known and are listed in, for example, Ullmann's Encyclopedia of Industrial Chemistry, Vol. A21, page 169, 5th Edition, VCH Weinheim, 1992; other sources of glass transition temperatures of homopolymers include, for example, J. Brandrup, E. H. Immergut, Polymer Handbook, 1st Edition, J. Wiley, New York 1966, 2nd Edition, J. Wiley, New York 1975, and 3rd Edition, J. Wiley, New York 1989. For ethyl acrylate a figure of −13° C. is used.

The actual glass transition temperature of the dispersed polymer in the polymer dispersion of the invention (first and second stages) is preferably in the region of less than 0° C., e.g., from −40° C. to less than 0° C. The actual glass transition temperature may be determined by means of differential scanning calorimetry (ASTM D 3418-08, midpoint temperature). The glass transition temperature of the polymer in the polymer dispersion is the glass transition temperature obtained on evaluation of the second heating curve (heating rate 20° C./min).

The weight ratio of the amount of the monomers used in the first stage to the amount of the monomers used in the second stage is preferably from 5:95 to 50:50 or from 5:95 to 40:60, more preferably from 10:90 to 30:70.

The polymer dispersion of the invention is prepared by emulsion polymerization. In the emulsion polymerization, ethylenically unsaturated compounds (monomers) are polymerized in water, with the use typically of ionic and/or nonionic emulsifiers and/or protective colloids or stabilizers as interface-active compounds for stabilizing the monomer droplets and the polymer particles subsequently formed from the monomers. In accordance with the invention, however, the polymerizations of both first and second stages takes place wholly or virtually without emulsifier. For the stabilization of the polymer dispersion formed in the polymerization of the second stage, the polymer of the first stage is used, which is converted in situ, by addition of neutralizing agent, from a water-insoluble polymer which is not active as a protective colloid, into a water-soluble polymer which is active as a protective colloid.

The neutralization of acid groups of the first polymer takes place preferably by feed addition of a neutralizing agent before and/or during (more preferably during) the polymerization of the second stage. After all of the monomers have been fed in, the amount of neutralizing agent present in the polymerization vessel is preferably the amount needed to neutralize at least 10%, preferably 30% to 100% or 30% to 90%, of acid equivalents.

The emulsion polymerization of the first and second stages may be started using water-soluble initiators. Water-soluble initiators are, for example, ammonium salts and alkali metal salts of peroxodisulfuric acid, e.g., sodium peroxodisulfate, hydrogen peroxide, or organic peroxides, e.g., tert-butyl hydroperoxide. Also suitable as initiators are what are called reduction-oxidation (redox) initiator systems. The redox initiator systems are composed of at least one, usually inorganic, reducing agent and one organic or inorganic oxidizing agent. The oxidizing component comprises, for example, the emulsion polymerization initiators already stated above. The reducing component comprises, for example, alkali metal salts of sulfurous acid, such as sodium sulfite, sodium hydrogen sulfite, alkali metal salts of disulfurous acid such as sodium disulfite, bisulfite addition compounds with aliphatic aldehydes and ketones, such as acetone bisulfite, or reducing agents such as hydroxymethanesulfinic acid and its salts, or ascorbic acid. The redox initiator systems may be used in conjunction with soluble metal compounds whose metallic component is able to occur in a plurality of valence states. Typical redox initiator systems are, for example, ascorbic acid/iron(II) sulfate/ sodium peroxydisulfate, tert-butyl hydroperoxide/sodium disulfite, and tert-butyl hydroperoxide/Na hydroxymethanesulfinic acid. The individual components, the reducing component for example, may also be mixtures, an example being a mixture of the sodium salt of hydroxymethanesulfinic acid with sodium disulfite.

The stated initiators are used mostly in the form of aqueous solutions, with the lower concentration being determined by the amount of water that is acceptable in the dispersion, and the upper concentration by the solubility of the respective compound in water. Generally speaking, the concentration of the initiators is 0.1% to 30%, preferably 0.5% to 20%, more preferably 1.0% to 10%, by weight, based on the monomers to be polymerized. It is also possible for two or more different initiators to be used in the emulsion polymerization.

The chain transfer agents stated above may be used in the polymerization of the second stage. Preferably, however, the polymerization of the second stage takes place without addition of further chain transfer agents.

The emulsion polymerization takes place in general at 30 to 130° C., preferably at 50 to 90° C. The polymerization medium may be composed of water alone, or of mixtures of water and water-miscible liquids such as methanol. It is preferred to use just water. The emulsion polymerization of the first stage may be carried out either as a batch operation or in the form of a feed process, including staged or gradient procedures. For more effective setting of the particle size it is preferred, in the polymerization, to include a polymer seed in the initial charge.

The way in which the initiator is added to the polymerization vessel in the course of the free-radical aqueous emulsion polymerization is known to a person of ordinary skill in the art. It may be included in its entirety in the initial charge to the polymerization vessel, or introduced, continuously or in stages, at the rate at which it is consumed in the course of the radical aqueous emulsion polymerization. In each individual case, this will depend on the chemical nature of the initiator system and on the polymerization temperature. It is preferred to include a portion in the initial charge and to supply the remainder to the polymerization zone at the rate of its consumption. For the purpose of removing the residual monomers, it is customary to add initiator after the end of the actual emulsion polymerization as well, i.e., after a monomer conversion of at least 95%. The individual components may be added to the reactor, in the case of the feed process, from above, in the side or from below, through the reactor bottom.

The emulsion polymerization produces aqueous polymer dispersions having solids contents generally of 15% to 75%, preferably of 40% to 75%, and more preferably of greater than or equal to 50%, by weight. For a high space/time yield of the reactor, dispersions with a very high solids content are preferred. In order to be able to attain solids contents >60% by weight, a bimodal or polymodal particle size ought to be set, since otherwise the viscosity becomes too high and the dispersion can no longer be handled. Producing a new generation of particles can be accomplished, for example, by adding seed, by adding excess amounts of emulsifier, or by adding miniemulsions. A further advantage associated with the low viscosity at high solids content is the improved coating behavior at high solids contents. Producing one or more new generations of particles can be done at any desired point in time. This point in time is guided by the particle size distribution that is aimed at for a low viscosity.

The polymer prepared in this way is used preferably in the form of its aqueous dispersion. The size distribution of the dispersion particles may be monomodal, bimodal or multimodal. In the case of monomodal particle size distribution, the average particle size of the polymer particles dispersed in the aqueous dispersion is preferably less than 400 nm, more particularly less than 200 nm. By average particle size here is meant the d50 of the particle size distribution, i.e., 50% by weight of the total mass of all the particles have a particle diameter smaller than the $d_{50}$. The particle size distribution can be determined in a known way by hydrodynamic chromatography (HDC). In the case of bimodal or multimodal particle size distribution, the particle size may be up to 1000 nm. The pH of the polymer dispersion is set preferably to a pH of more than 5, more particularly to a pH between 5.5 and 8.

Dissolved Polymer (B)

The polymer (B) dissolved in the aqueous polymer dispersion may be prepared by radical polymerization, preferably by solution polymerization, from (b1) at least one ethylenically unsaturated, radically polymerizable monomer having at least one oxazoline group, and (b2) at least 5%, preferably at least 7% or at least 10%, by weight, based on the total monomer amount of the polymer B, of at least one hydrophilic, ethylenically unsaturated, radically polymerizable monomer without oxazoline group and with a water solubility of at least 100 g/l, preferably at least 200 g/l, at 25° C., and (b3) optionally further monomers, different from the monomers (b1) and (b2).

In the case of monomers (b2) containing acid groups, the water solubility relates in each case to neutralized acid groups.

The monomers (b1) containing oxazoline groups are used preferably in an amount in the range from 10 to 60 parts by weight, more preferably from 25 to 50 parts by weight, per 100 parts by weight of the sum of the monomers of the polymer (B).

The hydrophilic monomers (b2) are used preferably in an amount in the range from 5 to 50 parts by weight, more preferably from 7 to 25 parts by weight, per 100 parts by weight of the sum of the monomers of the polymer (B).

The optional monomers (b3) are used preferably in an amount in the range from 0 to 85 parts by weight, e.g., from 30 to 85 parts by weight, more preferably from 40 to 60 parts by weight per 100 parts by weight of the sum of the monomers of the polymer (B).

Suitable water-soluble polymers of monomers comprising oxazoline groups, copolymerized with hydrophilic monomers, are described in U.S. Pat. No. 5,300,602, for example.

Monomers comprising oxazoline groups are preferably used exclusively in the soluble polymer (B) and not in the dispersed polymer (A). The monomers containing oxazoline groups comprise a monoethylenically unsaturated, hydrophilic monomer which comprises at least one oxazoline group, more particularly at least one 2-oxazoline group (also called oxazoline monomer below). The monomer preferably comprises exactly one oxazoline group, more particularly exactly one 2-oxazoline group.

An oxazoline monomer is an organic compound comprising at least one ethylenically unsaturated group and at least one oxazoline group. For the purposes of the present invention, an oxazoline group refers to a heterocyclic compound which comprises a five-membered ring comprising exactly one oxygen atom and exactly one nitrogen atom. More particularly the oxazoline group is a 2-oxazoline group, which can be described by the following structural element.

The oxazoline monomer is preferably a compound of formula:

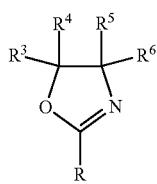

where the radicals have the following definitions:

R is a $C_{2-20}$ alkenyl radical comprising at least one ethylenically unsaturated group;

$R^3$, $R^4$, $R^5$, and $R^6$ are selected independently of one another from H, halogen, $C_{1-20}$ alkyl, $C_{2-20}$ alkenyl, $C_{6-20}$ aryl, $C_{7-32}$ arylalkyl, $C_{1-20}$ hydroxyalkyl, $C_{1-20}$ aminoalkyl, and $C_{1-20}$ haloalkyl, and preferably are selected from H, halogen, and $C_{1-20}$ alkyl.

An ethylenically unsaturated group denotes a terminal C=C double bond. Alkyl denotes a univalent radical consisting of a linear, branched or cyclic hydrocarbon group, preferably of a linear or branched hydrocarbon chain, more particularly comprising 1 to 20 carbon atoms, preferably 1 to 18 carbon atoms, more preferably 1 to 12 carbon atoms. The alkyl radical may for example be methyl, ethyl, n-propyl, or isopropyl.

Alkenyl denotes a univalent radical consisting of a linear or branched hydrocarbon chain, more particularly comprising 2 to 20 carbon atoms, preferably 2 to 18 carbon atoms, more preferably 2 to 12 carbon atoms, which comprises one or more C—C double bonds, it being possible for the C—C double bonds to occur within the hydrocarbon chain or at the end of the hydrocarbon chain (terminal C=C double bond). An alkenyl radical may for example be an allyl radical.

Aryl denotes a substituted or unsubstituted aromatic hydrocarbon group, more particularly comprising 6 to 20 carbon atoms. The aryl radical may for example be a phenyl group.

Arylalkyl denotes a univalent radical derived from a linear or branched alkyl radical, more particularly comprising 1 to 20 carbon atoms, preferably 2 to 18 carbon atoms, more preferably 2 to 12 carbon atoms, by the replacement of one or more hydrogen atoms with an aryl group, the aryl group being a substituted or unsubstituted aromatic hydrocarbon group, more particularly comprising 6 to 14 carbon atoms. The aromatic hydrocarbon group may for example be phenyl; the arylalkyl radical may for example be a benzyl radical.

Halogen denotes a substituent selected from fluorine, chlorine, bromine or iodine, preferably chlorine.

Haloalkyl denotes a univalent radical derived from a linear or branched alkyl radical, more particularly comprising 2 to 20 carbon atoms, preferably 2 to 18 carbon atoms, more preferably 2 to 12 carbon atoms, by the replacement of one or more hydrogen atoms with a halogen atom (—F, —Cl, —Br, —I, more particularly Cl). Similar comments apply in respect of the radicals hydroxyalkyl and aminoalkyl.

Preferably R is a $C_{1-10}$ alkenyl radical, preferably a $C_{1-6}$ alkenyl radical, comprising at least one ethylenically unsaturated group. In one preferred embodiment, the radical R comprises exactly one ethylenically unsaturated group. The radical R is selected more particularly from vinyl, allyl, isopropenyl (2-propen-2-yl), 2-propen-1-yl, 3-buten-1-yl, or 4-buten-1-yl. Especially preferably R is vinyl or isopropenyl, more preferably isopropenyl.

The radicals $R^3$, $R^4$, $R^5$, and $R^6$ are preferably selected, independently of one another, from H, halogen, $C_{1-10}$ alkyl, $C_{6-12}$ aryl, $C_{7-13}$ arylalkyl, $C_{1-10}$ alkoxy, $C_{1-10}$ hydroxyalkyl, $C_{1-10}$ aminoalkyl, and $C_{1-10}$ haloalkyl, and more particularly are selected from H and $C_{1-6}$ alkyl, very preferably from H, methyl, ethyl, n-propyl, isopropyl, n-butyl, n-pentyl, and n-hexyl, and more particularly are selected from H, methyl, and ethyl. In one preferred embodiment, at least two of the radicals $R^3$, $R^4$, $R^5$, and $R^6$ are H. In one preferred embodiment, the radicals $R^3$ and $R^4$ are H. In one preferred embodiment, all radicals $R^3$, $R^4$, $R^5$, and $R^6$ are H. In one preferred embodiment, at least two of the radicals $R^3$, $R^4$, $R^5$, and $R^6$ are H.

In one preferred embodiment, the radicals $R^3$, $R^4$, $R^5$, and $R^6$ independently of one another are selected from H, methyl, and ethyl, and at least two of the radicals $R^3$, $R^4$, $R^5$, and $R^6$ are H, the radicals $R^3$ and $R^4$ preferably being H.

With more particular preference the oxazoline monomers comprise at least one monomer selected from the group consisting of 2-vinyl-2-oxazoline, 2-vinyl-4-methyl-2-oxazoline, 2-vinyl-5-methyl-2-oxazoline, 2-vinyl-4-ethyl-2-oxazoline, 2-vinyl-4,4-dimethyl-2-oxazoline, 2-vinyl-5,5-dimethyl-2-oxazoline, 2-vinyl-4,4,5,5-tetramethyl-2-oxazoline, 2-isopropenyl-2-oxazoline, 2-isopropenyl-4-methyl-2-oxazoline, 2-isopropenyl-5-methyl-2-oxazoline, 2-isopropenyl-4-ethyl-2-oxazoline, 2-isopropenyl-5-ethyl-2-oxazoline, 2-isopropenyl-4,4-dimethyl-2-oxazoline, 2-isopropenyl-5,5-dimethyl-2-oxazoline and 2-isopropenyl-4,4,5,5-tetramethyl-2-oxazoline. Particular preference is given to the use of 2-vinyl-2-oxazoline and/or 2-isopropenyl-2-oxazoline; especially preferred is 2-isopropenyl-2-oxazoline (iPOx).

The hydrophilic, water-soluble monomers (b2) are monomers having a water solubility of at least 100 g/l, preferably at least 200 g/l, at 25° C.

Water-soluble monomers (b2) are, for example, monomers with acid groups (acid monomers, the water solubility relating to their deprotonated form), monomers with polyalkylene glycol groups, and polymerizable amides.

Acid monomers which can be used are the same as those described above for the acid monomers of the first polymerization stage of the dispersed polymer.

Monomers with polyalkylene glycol groups are, for example, polyalkylene glycol (meth)acrylates and alkoxypolyalkylene glycol (meth)acrylates having preferably 2, 3 and/or 4 C atoms in the alkylene glycol unit and preferably 1 to 4 C atoms in the alkyl group, and having preferably at least 3, more particularly at least 5, alkylene glycol units, e.g., from 3 to 70, more preferably from 5 to 15, alkylene glycol units. Preferred monomers with polyethylene glycol groups are those having preferably at least 3, more particularly at least 5, ethylene glycol units, e.g., from 3 to 70, more preferably from 5 to 15, ethylene glycol units. Examples of suitable commercial products are Bisomer® MPEG350MA and Bisomer® MPEG550MA.

Further water-soluble monomers (b2) are, for example, monoethylenically unsaturated, anionic, water-soluble monomers which have at least one anionic group based on an acid having a pKa of less than 2, more particularly monomers having at least one sulfonic acid group, particularly the alkali metal salts thereof, examples being the sodium or potassium salts, and also the ammonium salts. This includes the salts of ethylenically unsaturated sulfonic acids, especially vinylsulfonic acid, 2-acrylamido-2-methylpropanesulfonic acid, 2-acryloyloxyethanesulfonic acid or 2-methacryloyloxyethanesulfonic acid, 3-acryloyloxy- or 3-methacryloyloxypropanesulfonic acid, or vinylbenzenesulfonic acid.

The monomers (b2) further include monoethylenically unsaturated, nonionic, water-soluble monomers. Examples of such are the amides of the aforementioned ethylenically unsaturated carboxylic acids, especially acrylamide or methacrylamide, hydroxyalkyl esters of the aforementioned alpha,beta-ethylenically unsaturated C3-C8 monocarboxylic acids or of the alpha,beta-ethylenically unsaturated C4-C8 dicarboxylic acids, especially hydroxyethyl acrylate, hydroxyethyl methacrylate, 2- or 3-hydroxypropyl acrylate, 2- or 3-hydroxypropyl methacrylate, esters of the aforementioned monoethylenically unsaturated monocarboxylic or dicarboxylic acids with C2-C4 polyalkylene glycols, especially the esters of these carboxylic acids with polyethylene glycol or alkyl-polyethylene glycols, in which case the (alkyl)polyethylene glycol residue preferably has a molecular weight in the range from 100 to 3000 g/mol, more preferably from 200 to 1000 g/mol or from 3 to 70, more preferably from 5 to 15, ethylene glycol units. The monomers (b2) further include N-vinyl amides such as N-vinylformamide, N-vinylpyrrolidone, N-vinylimidazole, or N-vinylcaprolactam.

The monomers (b2) further include monoethylenically unsaturated, cationic, water-soluble monomers which have at least one cationic group and/or at least one group which can be protonated in an aqueous environment. These monomers include more particularly those which have a protonatable amino group, a quaternary ammonium group, a protonatable imino group, or a quaternized imino group. Examples of monomers having a protonatable imino group are N-vinylimidazole or vinylpyridines. Examples of monomers having a quaternized imino group are N-alkylvinylpyridinium salts or N-alkyl-N'-vinylimidazolinium salts such as N-methyl-N'-vinylimidazolinium chloride or monosulfate. Particularly preferred among these monomers are those of the general formula I

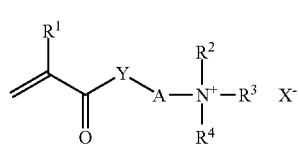

(I)

in which
R1 is hydrogen or C1-C4 alkyl, especially hydrogen or methyl,
R2 and R3 independently of one another are C1-C4 alkyl, especially methyl, and
R4 is hydrogen or C1-C4 alkyl, especially hydrogen or methyl,
Y is oxygen, NH, or NR5 with R5=C1-C4 alkyl,
A is C2-C8 alkylene, e.g., 1,2-ethanediyl, 1,2- or 1,3-propanediyl, 1,4-butanediyl, or 2-methyl-1,2-propanediyl, optionally interrupted by 1, 2, or 3 nonadjacent oxygen atoms, and
X$^-$ is one anion equivalent, e.g., halides such as Cl$^-$, BF$_4^-$, HSO$_4^-$, ½SO$_4^{2-}$, or CH$_3$OSO$_3^-$,
and, for R4=H, the free bases of the monomers of the formula I.

Examples of monomers of this kind are 2-(N,N-dimethylamino)ethyl acrylate, 2-(N,N-dimethyl-amino)ethyl acrylate methochloride, 2-(N,N-dimethylamino)ethyl methacrylate, 2-(N,N-dimethyl-amino)ethylacrylamide, 3-(N,N-dimethylamino)propylacrylamide, 3-(N,N-dimethylamino)propylmethacrylamide, 2-(N,N-dimethylamino)ethylmethacrylamide, 2-(N,N,N-trimethylammonio)ethyl methacrylate chloride, 2-(N,N,N-trimethylammonio)ethylmethacrylamide chloride, 3-(N,N,N-trimethylammonio)propylacrylamide chloride, 3-(N,N,N-trimethylammonio)propylmethacrylamide chloride, 2-(N,N,N-trimethylammonio) ethylacrylamide chloride, and also the corresponding monosulfates or sulfates. Preferred are 2-(N,N-dimethylamino)ethyl acrylate, 2-(N,N-dimethylamino)ethyl acrylate methochloride, or 2-(N,N-dimethylamino)ethyl methacrylate.

Preferred monomers (b2) are the salts of ethylenically unsaturated sulfonic acids, acrylamide, methacrylamide, and the esters of unsaturated carboxylic acids with polyethylene glycol or alkyl-polyethylene glycol. Particularly preferred monomers (b2) are methoxy-polyethylene glycol methacrylate having on average 8 to 12 ethylene glycol units (e.g., Bisomer MPEG 550 MA, Bisomer MPEG 350 MA from Geo Specialties), and the sodium salt of 2-acrylamido-2-methylpropanesulfonic acid.

The further monomers (b3) are used preferably in amounts which do not substantially detract from the solubility of the polymer (B) in the polymer dispersion. Examples of monomers (b3) are nonionic, ethylenically unsaturated, radically polymerizable monomers selected from the group consisting of C1 to C20 alkyl (meth) acrylates, vinyl esters of carboxylic acids comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms and one or two double bonds, and mixtures of these monomers. Examples of monomers (b3) are (meth)acrylic acid alkyl esters with a C$_1$-C$_{10}$ alkyl radical, such as methyl methacrylate, methyl acrylate, n-butyl acrylate, ethyl acrylate, and 2-ethylhexyl acrylate. Also suitable in particular are mixtures of the (meth)acrylic acid alkyl esters. Vinyl esters of carboxylic acids having 1 to 20 C atoms are, for example, vinyl laurate, vinyl stearate, vinyl propionate, Versatic acid vinyl esters, and vinyl acetate. Vinylaromatic compounds contemplated include vinyl toluene, alpha- and para-methylstyrene, alpha-butylstyrene, 4-n-butylstyrene, 4-n-decylstyrene, and—preferably—styrene. Examples of nitriles are acrylonitrile and methacrylonitrile. The vinyl halides are chloro-, fluoro-, or bromo-substituted ethylenically unsaturated compounds, preferably vinyl chloride and vinylidene chloride. Examples of vinyl ethers include vinyl methyl ether or vinyl isobutyl ether. Preferred vinyl ethers are those of alcohols comprising 1 to 4 C atoms. Hydrocarbons having 4 to 8 C atoms and two olefinic double bonds include butadiene, isoprene, and chloroprene. Preferred monomers (b3) are the C$_1$ to C$_{10}$ alkyl acrylates and methacrylates, especially C$_1$ to C$_8$ alkyl acrylates and methacrylates.

In one embodiment of the invention, the polymer B is a copolymer comprising (as structural units):
(b1) at least one ethylenically unsaturated monomer which comprises at least one oxazoline group;
(b2) as water-soluble monomer, at least one ethylenically unsaturated monomer (b2) which comprises at least one sulfonic acid group (—SO$_3$M), where M denotes a cation; and
(b3) as monomer (b3), at least one monomer selected from the group consisting of C$_{1-20}$ alkyl (meth)acrylates and C$_{8-20}$ vinylaromatics; and optionally at least one further monomer;
where the fraction the monomers (b1) and (b2) in total is preferably less than 50% by weight, based on the total amount of the monomers in the polymer B. In the polymer B of the invention, the fraction of the monomers (b1) and (b2) in total is preferably 2% to 49.9%, more preferably 10% to 49.5%, especially preferably 25% to 49%, very preferably 30% to 45%, by weight, based on the total amount of the monomers in the polymer B.

The weight ratio of monomers (b2) to monomer (b1) is preferably in the range from 0.1 to 1, preferably from 0.25 to 0.9; more particularly from 0.3 to 0.75, very preferably in the range from 0.3 to 0.5.

In one embodiment, the polymer B of the invention comprises as water-soluble monomer (b2) exclusively an ethylenically unsaturated monomer which comprises at least one sulfonic acid group, the sum of the monomers (b1) and (b2) being less than 50%, preferably 2% to 49.9%, preferably 10% to 49.5%, especially preferably 25% to 49%, more preferably 30% to 45%, by weight, based on the total amount of the monomers in the polymer B.

The polymer B may comprise as monomer (b3), for example, 50% to 98% by weight, based on the total amount of the monomers in the polymer B, of at least one monomer selected from the group consisting of $C_{1-8}$ alkyl (meth)acrylates.

More particularly the monomer (b3) is a monoethylenically unsaturated, hydrophobic monomer, which in particular is not water-soluble, i.e., does not have the water solubility defined above. In particular the monomer (b3) has a water solubility of less than 100 g/l, more preferably less than 25 g/l.

The at least one monomer (b3) may typically be selected from the group consisting of the following: methyl (meth)acrylate, ethyl (meth)acrylate, n-butyl (meth)acrylate, isobutyl (meth)acrylate, tert-butyl (meth)acrylate, sec-butyl (meth)acrylate, 2-ethylhexyl (meth)acrylate, tridecyl (meth)acrylate, cyclohexyl (meth)acrylate, n-octyl (meth)acrylate, n-lauryl (meth)acrylate, benzyl (meth)acrylate, styrene, alpha-methylstyrene, and vinyltoluene.

In one preferred embodiment the monomer (b3) comprises one or more $C_{1-20}$ alkyl (meth)acrylates, preferably one or more $C_{1-12}$ alkyl (meth)acrylates, more preferably one or more $C_{1-8}$ alkyl (meth)acrylates. With particular preference monomer (b3) comprises at least one monomer selected from methyl acrylate (MA), methyl methacrylate (MMA), ethyl acrylate (EA), ethyl methacrylate (EMA), n-butyl acrylate, n-butyl methacrylate, t-butyl acrylate, t-butyl methacrylate, 2-ethylhexyl acrylate, and 2-ethylhexyl methacrylate, preferably selected from methyl acrylate, methyl methacrylate, n-butyl acrylate, and n-butyl methacrylate. With particular preference the monomer (b3) comprises methyl acrylate and/or methyl methacrylate. With particular preference the monomer (b3) comprises n-butyl acrylate and/or n-butyl methacrylate. With particular preference the monomer (b3) comprises a mixture of n-butyl acrylate and methyl methacrylate.

The polymer B of the invention preferably comprises as monomer (b3) 30% to 85%, preferably 40% to 60%, by weight, based on the total amount of the monomers in the polymer B, of at least one monomer selected from the group consisting of $C_{1-8}$ alkyl (meth)acrylates, preferably consisting of methyl acrylate (MA), methyl methacrylate (MMA), ethyl acrylate (EA), ethyl methacrylate (EMA), n-butyl acrylate, and n-butyl methacrylate, more preferably consisting of methyl acrylate, methyl methacrylate, n-butyl acrylate, and n-butyl methacrylate.

The polymer B may comprise for example as monomer (b2) 5% to 50% by weight, based on the total amount of the monomers in the polymer B, of at least one compound of the following formula:

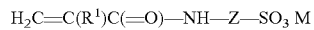

$$H_2C=C(R^1)C(=O)-NH-Z-SO_3 M$$

where the radicals and indices have the following definitions:

$R^1$ is H or methyl; Z is a divalent linking group selected from a bond, $C_{1-10}$ alkylene, phenylene, and C1_10 alkylphenylene (preferably $C_{1-10}$ alkylene); and M is one or more metals, selected more particularly from alkali metal salts and/or alkaline earth metal salts, preferably selected from sodium (Na), potassium (K), magnesium (Mg), and calcium (Ca).

Preferably Z is a group $-(CH_2)_n-$ where n is 1 to 12; $-CH(CH_3)-CH_2-$; $-CH(CH_3)-CH_2-CH_2-$; $-C(CH_3)_2-CH_2-$; $-C(CH_3)_2-CH_2-CH_2-$; $-C(CH_3)_2-CH_2-C(CH_3)_2-CH_2-$ or $-C(CH_3)_2-CH_2-CH_2-C(CH_3)_2-CH_2-$.

The monomer (b2) preferably comprises at least one monomer selected from the group consisting of vinylsulfonic acid, allylsulfonic acid, 2-acrylamido-2-methylpropanesulfonic acid (AMPS), 2-methacrylamido-2-methylpropanesulfonic acid, 2-acrylamidobutanesulfonic acid, 3-acrylamido-3-methylbutanesulfonic acid, 2-acrylamido-2,4,4-trimethylpentanesulfonic acid, vinylphosphonic acid, allylphosphonic acid, N-(meth)acrylamidoalkylphosphonic acids, and (meth)acryloyloxyalkylphosphonic acids. More preferably the monomer (b2) comprises at least one monomer selected from the group consisting of vinylsulfonic acid, allylsulfonic acid, 2-acrylamido-2-methylpropanesulfonic acid (AMPS), 2-methacrylamido-2-methylpropanesulfonic acid, 2-acrylamidobutanesulfonic acid, 3-acrylamido-3-methylbutanesulfonic acid, and 2-acrylamido-2,4,4-trimethylpentanesulfonic acid.

The stated acids (monomer (b2)) always also include the corresponding salts, especially ammonium, alkali metal and/or alkaline earth metal salts. With preference the abovementioned monomers (b2) comprise the corresponding ammonium salts and/or metal salts, preferably the corresponding alkali metal and/or alkaline earth metal salts, more preferably sodium and/or potassium salts. With particular preference the monomer (b2) comprises 2-acrylamido-2-propanesulfonic acid (AMPS) and/or salts thereof, more particularly 2-acrylamido-2-propanesulfonic acid sodium salt (AMPS-Na), or monomer mixtures consisting of at least 50% by weight of AMPS and/or salts thereof and at least one further monomer (b2).

The term "polymer comprising the monomers stated above" is understood by the skilled worker, in the sense of the present invention, to mean that the polymer in question has been prepared from the stated monomers, more particularly by radical polymerization of the stated monomers. The polymers of the invention therefore comprise the monomer units, and/or are constructed from them, which correspond to the monomers employed. The skilled person is aware that the polymer, depending on the nature of its preparation, may also have starting groups and/or end groups (e.g., radical initiator groups) and/or residues of additives, such as of surfactants and/or radical initiators, for example.

In one preferred embodiment, the polymer B of the invention consists of the stated monomers (b1), (b2), and (b3), meaning that it has been prepared by polymerization exclusively of the stated monomers.

In one particularly preferred embodiment, the invention relates to a polymer B comprising: 10 to 60%, preferably 25 to 50%, by weight of the at least one monomer (b1), where monomer (b1) comprises at least one monomer selected from 2-vinyl-2-oxazoline, 2-vinyl-4-methyl-2-oxazoline, 2-vinyl-5-methyl-2-oxazoline, 2-vinyl-4-ethyl-2-oxazoline, 2-vinyl-4,4-dimethyl-2-oxazoline, 2-vinyl-5,5-dimethyl-2-oxazoline, 2-vinyl-4,4,5,5-tetramethyl-2-oxazoline, 2-isopropenyl-2-oxazoline, 2-isopropenyl-4-methyl-2-oxazoline, 2-isopropenyl-5-methyl-2-oxazoline, 2-isopropenyl-4-ethyl-2-oxazoline, 2-isopropenyl-5-ethyl-2-oxazoline, 2-isopropenyl-4,4-dimethyl-2-oxazoline, 2-isopropenyl-5,5-dimethyl-2-oxazoline, and 2-isopropenyl-4,4,5,5-tetramethyl-2-oxazoline, monomer (b1) preferably being 2-isopropenyl-2-oxazoline (iPOx); 5 to 50%, preferably 7 to 30%, by weight of the at least one monomer (b2), where monomer (b2) comprises a monoethylenically unsaturated monomer (b2) which comprises precisely one sulfonic acid group (—SO3H), monomer (b2) preferably comprising 2-acrylamido-2-methylpropanesulfonic acid or an alkali metal and/or alkaline earth metal salt of 2-acrylamido-2-methylpropanesulfonic acid, preferably the sodium salt of 2-acrylamido-2-methylpropanesulfonic acid (AMPS-Na);

30 to 85%, preferably 40 to 60%, by weight of at least one monomer (b3), where monomer (b3) comprises at least one $C_{1-12}$ alkyl (meth)acrylate, preferably at least one $C_{1-6}$ alkyl (meth)acrylate selected from methyl acrylate (MA), methyl methacrylate (MMA), ethyl acrylate (EA), ethyl methacrylate (EMA), n-butyl acrylate (n-BA), and n-butyl methacrylate (n-BMA); 0 to 10%, preferably 0 to 5%, especially preferably 0 to 1%, preferably 0.1 to 1%, by weight of at least one further monomer, different from the aforementioned monomers, and/or additive.

In one particularly preferred embodiment the invention relates to a polymer B formed from: 25% to 50% by weight of isopropenyloxazoline (iPOx) as monomer (b1); 5% to 50% by weight of 2-acrylamido-2-methylpropanesulfonic acid sodium salt (AMPS-Na) as monomer (b2);

40% to 60% by weight of at least one $C_{1-12}$ alkyl (meth) acrylate selected from methyl acrylate, methyl methacrylate, ethyl acrylate, ethyl methacrylate, n-butyl acrylate, and n-butyl methacrylate, as monomer (b3);

0% to 1% by weight of at least one further monomer, different from the aforementioned monomers and/or additive.

The dissolved polymer (B) may be prepared by a solution polymerization. In this way it is possible to achieve relatively low molecular weights. Solvents used may be water or organic solvents. The organic solvents used are removed after the polymerization or exchanged for water.

The polymer dispersions of the invention are used in accordance with the invention in aqueous adhesive preparations for the production of laminates, i.e., in aqueous laminating adhesive preparations for the bonding of substrates of large surface area, more particularly for the production of composite films.

The present invention hence also provides a process for producing composite films that uses an aqueous adhesive preparation which comprises at least one polymer dispersion of the invention. In this process, the aqueous polymer dispersions may be used as they are or after formulation with typical auxiliaries. Examples of typical auxiliaries include wetting agents, thickeners, other protective colloids, light stabilizers, biocides, defoamers, tackifiers, etc. In the process for producing composite films, at least two films are bonded with one another using the aqueous polymer dispersion.

In the process of the invention for producing composite films, the polymer dispersion of the invention, or an appropriately formulated preparation, is applied to the large-surface-area substrates to be bonded, preferably with a layer thickness of 0.1 to 20 g/m², more preferably 1 to 7 g/m², by means, for example, of knife coating, spreading, etc. Typical coating techniques may be employed, examples being roller coating, reverse roller coating, gravure roller coating, reverse gravure roller coating, brush coating, rod coating, spray coating, air brush coating, meniscus coating, curtain coating or dip coating. After a short time for the water of the dispersion to evaporate (preferably after 1 to 60 seconds), the coated substrate may then be laminated with a second substrate, the temperature being able, for example, to be 20 to 200° C., preferably 20 to 100° C., and the pressure being able to be, for example, 100 to 3000 kN/m², preferably 300 to 2000 kN/m².

The polymer dispersion of the invention is employed preferably as a one-component composition, i.e., without additional crosslinking agents, more particularly without isocyanate crosslinkers. At least one of the films may be metalized or printed on the side that is coated with adhesive. Examples of suitable substrates include polymer films, more particularly of polyethylene (PE), oriented polypropylene (OPP), unoriented polypropylene (CPP), polyamide (PA), polyethylene terephthalate (PET), polyacetate, cellophane, polymer films (vapor-)coated with metal, e.g., with aluminum (metalized films for short), or metal foils, of aluminum, for example. The stated films and foils may be bonded with one another or with a foil or film of a different type—for example, polymer films with metal foils, different polymer films with one another, etc. The stated foils and films may also, for example, be printed with printing inks.

One embodiment of the invention is a composite film produced using one of the aqueous polymer dispersions of the invention as described above, the material of a first film being selected from OPP, CPP, PE, PET, and PA, and the material of a second film being selected from OPP, CPP, PE, PET, PA, and metal foil. In one embodiment of the invention, the first film and/or the second film is metalized or printed on the respective side coated with the polymer dispersion of the invention. The thickness of the substrate films may be, for example, from 5 to 100 µm, preferably from 5 to 40 µm.

Surface treatment of the film substrates prior to coating with a polymer dispersion of the invention is not absolutely necessary. Better results, however, may be obtained if the surface of the film substrates is modified prior to coating. In this case it is possible to employ typical surface treatments, an example being corona treatment, for the purpose of intensifying the adhesion effect. The corona treatment or other surface treatments are carried out to the extent required for sufficient wettability with the coating composition. Typically, corona treatment of approximately 10 watts per square meter per minute is sufficient for this purpose. Alternatively or additionally it is also possible, optionally, to use primers or tie coats between film substrate and adhesive coating. Furthermore, other, additional functional layers may be present on the composite films, examples being barrier layers, print layers, color layers or varnish layers, or protective layers. These functional layers may be located externally, i.e., on the side of the film substrate facing away from the adhesive-coated side, or internally, between film substrate and adhesive layer.

It is an advantage of the invention that a wide variety of different substrates can be bonded with one another, i.e., laminated, with the polymer dispersions of the invention ensuring effective adhesion of the adhesive preparation to the substrates and producing a high strength in the bonded assembly. Moreover, the polymer dispersions of the invention are notable for good instantaneous adhesion, good heat stability, and significantly increased chemical resistances, especially with respect to oily, acidic foodstuffs such as tomato ketchup.

Particular advantages of the preparation process of the invention and of the products of the invention are the following in particular:

long pot life, compared with isocyanates and carbodiimides,
good chemical resistance,
good instantaneous adhesion,
good heat stability,
virtually emulsifier-free operation is possible (in particular, small amounts of emulsifier when using an emulsifier-stabilized polymer seed are not detrimental).
cost saving by comparison with other protective colloid-stabilized polymer dispersions, since, because of the in situ preparation of the protective colloid, there is no need for separate synthesis, transport, and storage of the protective colloid.

EXAMPLES

Determination of Particle Size

The particle size is determined by hydrodynamic fractionation using a PSDA (Particle Size Distribution Analyzer) from Polymer Labs. The Cartridge PL0850-1020 column type used is operated with a flow rate of 2 ml/min. The samples are diluted to an absorption of 0.03 AU/μl with the eluent solution. The sample is eluted, through the size exclusion principle, in dependence on the hydrodynamic diameter 10. The eluent contains 0.2% by weight of dodecyl poly(ethylene glycol ether)23, 0.05% by weight of sodium dodecyl sulfate, 0.02% by weight of sodium dihydrogenphosphate, and 0.02% by weight of sodium azide in deionized water. The pH is 5.8. The elution time is calibrated using polystyrene latices. Measurement takes place in the 20 nm to 1200 nm range. Detection is carried out using a UV detector at a wavelength of 254 nm.

Determination of Glass Transition Temperature:

The glass transition temperature is measured by means of differential scanning calorimetry in accordance with ASTM D 3418-08. For conditioning, the polymers are poured out, dried overnight, then dried at 120° C. in a vacuum drying cabinet for 1 hour. At measurement, the sample is heated to 150° C., cooled rapidly, and then measured on heating at 20° C./min up to 150° C. The value reported is the mid point temperature.

Dispersed Polymer A

Comparative Example A1: (2 pphm Itaconic Acid, 0.1 pphm Acrylic Acid, Tg=5° C.)

A 2 L reactor with anchor stirrer, heated to 80° C., was filled with 5.8 g of a polystyrene seed (solids content (SC): 33%, particle size (PS): 30 nm) and 163.8 g of deionized water. When the internal temperature reached 80° C., 42.9 g of 7% strength sodium peroxodisulfate solution were added and the mixture was stirred for 2 minutes. This was followed by the metered addition over 60 minutes of an emulsion consisting of 111.84 g of deionized water, 6.0 g of itaconic acid, 1.1 g of sodium lauryl polyethoxysulfate (Disponil® FES 27, 28% strength in water, BASF SE), 28.5 g of n-butyl acrylate, 79.5 g of methyl acrylate, and 0.6 g of 2-ethylhexyl thioglycolate. At the same time the reaction temperature was raised to 85° C. over 60 minutes. Then a second emulsion feed, consisting of 86.82 g of deionized water, 4.3 g of sodium lauryl polyethoxysulfate (Disponil® FES 27, 28% strength in water, BASF SE), 0.6 g of acrylic acid, 12.0 g of hydroxypropyl acrylate, 120.0 g of n-butyl acrylate, and 353.4 g of methyl acrylate, was metered in over 180 minutes. 20 minutes after the start of the second emulsion feed, 49.2 g of 3.7% strength ammonium hydroxide solution were metered in over 160 minutes. After the end of the feed, 30.0 g of deionized water were added and the temperature was lowered to 80° C. At an internal temperature of 80° C., 44.6 g of acetone bisulfite (2.4% strength) and 12.0 g of tert-butyl hydroperoxide (10% strength) were metered in over 120 minutes. This was followed by the addition of 0.24 g of ammonia (25% strength) and 32.7 g of deionized water, and the experiment was cooled to room temperature. The dispersion had a solids content of 52%, a pH of 7, an overall glass transition temperature of 5° C., and a particle size of 228 nm.

Inventive Example A2: (1 pphm Itaconic Acid, 0.5 pphm Methacrylic Acid, Tg=−37° C.)

A 2 L reactor with anchor stirrer, heated to 80° C., was filled with 5.9 g of a polystyrene seed (SC: 33%, PS: 30 nm) and 166.5 g of deionized water. When the internal temperature reached 80° C., 46.4 g of 7% strength sodium peroxodisulfate solution were added and the mixture was stirred for 2 minutes. This was followed by the metered addition over 60 minutes of an emulsion consisting of 123.4 g of deionized water, 6.5 g of itaconic acid, 3.3 g of methacrylic acid, 1.2 g of sodium lauryl polyethoxysulfate (Disponil® FES 27, 28% strength in water, BASF SE), 110.5 g of n-butyl acrylate, 34.1 g of methyl acrylate, and 13.0 g of styrene. At the same time the reaction temperature was raised to 85° C. over 60 minutes. Then a second emulsion feed, consisting of 92.7 g of deionized water, 4.6 g of sodium lauryl polyethoxysulfate (Disponil® FES 27, 28% strength in water, BASF SE), 29.3 g of styrene, 438.8 g of n-butyl acrylate, and 14.6 g of methyl acrylate, was metered in over 180 minutes. 20 minutes after the start of the second emulsion feed, 58.5 g of 5.6% strength ammonium hydroxide solution were metered in over 120 minutes. After the end of the feed, 30.0 g of deionized water were added and the temperature was lowered to 80° C. At an internal temperature of 80° C., 33.0 g of acetone bisulfite (3.5% strength) and 13.0 g of tertbutyl hydroperoxide (10% strength) were metered in over 120 minutes. This was followed by the addition of 0.26 g of ammonia (25% strength) and 41.6 g of deionized water, and the experiment was cooled to room temperature. The dispersion had a solids content of 49%, a pH of 7.5, an overall glass transition temperature of −37° C., and a particle size of 253 nm.

Inventive Example A3: (1 pphm Itaconic Acid, 0.5 pphm Acrylic Acid, Tg=−37° C.)

A 2 L reactor with anchor stirrer, heated to 80° C., was filled with 6.6 g of a polystyrene seed (SC: 33%, PS: 30 nm) and 184.4 g of deionized water. When the internal temperature reached 80° C., 51.43 g of 7% strength sodium peroxodisulfate solution were added and the mixture was stirred for 2 minutes. This was followed by the metered addition over 60 minutes of an emulsion consisting of 136.7 g of deionized water, 7.2 g of itaconic acid, 3.6 g of acrylic acid, 1.3 g of sodium lauryl polyethoxysulfate (Disponil® FES 27, 28% strength in water, BASF SE), 122.4 g of n-butyl acrylate, 37.8 g of methyl acrylate, and 14.4 g of styrene. At the same time the reaction temperature was raised to 85° C. over 60 minutes. Then a second emulsion feed, consisting of 102.7 g of deionized water, 5.1 g of sodium lauryl polyethoxysulfate (Disponil® FES 27, 28% strength in water, BASF SE), 32.4 g of styrene, 486.0 g of n-butyl acrylate, and 16.2 g of methyl acrylate, was metered in over 180 minutes. 20 minutes after the start of the second emulsion feed, 64.8 g of 5.6% strength ammonium hydroxide solution and 10.3 g of a 7% strength sodium peroxodisulfate solution were metered in over 120 minutes. After the end of the feed, 46.1 g of deionized water were added and the temperature was lowered to 80° C. At an internal temperature of 80° C., 39.3 g of acetone bisulfite (7% strength) and 14.4 g of tert-butyl hydroperoxide (10% strength) were metered in over 120 minutes. This was followed by the addition of 0.3 g of ammonia (25% strength) and 46.1 g of deionized water, and the experiment was cooled to room temperature. The dispersion had a solids content of 52%, a pH of 8.3, an overall glass transition temperature of −37° C., and a particle size of 190 nm.

Comparative Example A4: (1 pphm Itaconic Acid and 0.5 pphm Acrylic Acid, 2.5 pphm Disponil® FES 27, Tg=−37° C.)

A 2 L reactor with anchor stirrer, heated to 80° C., was filled with 5.5 g of a polystyrene seed (SC: 33%, PS: 30 nm) and 153.7 g of deionized water. When the internal temperature reached 80° C., 42.9 g of 7% strength sodium peroxodisulfate solution were added and the mixture was stirred for 2 minutes. This was followed by the metered addition over 60 minutes of an emulsion consisting of 110.1 g of deionized water, 6.0 g of itaconic acid, 3.0 g of acrylic acid, 10.7 g of sodium lauryl polyethoxysulfate (Disponil® FES 27, 28% strength in water, BASF SE), 102.0 g of n-butyl acrylate, 31.5 g of methyl acrylate, and 12.0 g of styrene. At the same time the reaction temperature was raised to 85° C. over 60 minutes. Then a second emulsion feed, consisting of 67.3 g of deionized water, 42.9 g of sodium lauryl polyethoxysulfate (Disponil® FES 27, 28% strength in water, BASF SE), 27.0 g of styrene, 405.0 g of n-butyl acrylate, and 13.5 g of methyl acrylate, was metered in over 120 minutes. 20 minutes after the start of the second emulsion feed, 54.0 g of 5.6% strength ammonium hydroxide solution were metered in over 120 minutes. After the end of the feed, 38.4 g of deionized water were added and the temperature was lowered to 80° C. At an internal temperature of 80° C., 30.0 g of acetone bisulfite (3.5% strength) and 13.0 g of tertbutyl hydroperoxide (10% strength) were metered in over 120 minutes. This was followed by the addition of 0.24 g of ammonia (25% strength) and 38.4 g of deionized water, and the experiment was cooled to room temperature. The dispersion had a solids content of 49%, a pH of 7.5, an overall glass transition temperature of −37° C., and a particle size of 184 nm.

Comparative Example A5: (1 pphm Itaconic Acid, 0.5 pphm Acrylic Acid, 1 pphm Disponil® FES 27, Tg=−37° C.)

A 2 L reactor with anchor stirrer, heated to 80° C., was filled with 5.5 g of a polystyrene seed (SC: 33%, PS: 30 nm) and 153.7 g of deionized water. When the internal temperature reached 80° C., 42.9 g of 7% strength sodium peroxodisulfate solution were added and the mixture was stirred for 2 minutes. This was followed by the metered addition over 60 minutes of an emulsion consisting of 110.1 g of deionized water, 6.0 g of itaconic acid, 3.0 g of acrylic acid, 4.3 g of sodium lauryl polyethoxysulfate (Disponil® FES 27, 28% strength in water, BASF SE), 102.0 g of n-butyl acrylate, 31.5 g of methyl acrylate, and 12.0 g of styrene. At the same time the reaction temperature was raised to 85° C. over 60 minutes. Then a second emulsion feed, consisting of 67.3 g of deionized water, 17.1 g of sodium lauryl polyethoxysulfate (Disponil® FES 27, 28% strength in water, BASF SE), 27.0 g of styrene, 405.0 g of n-butyl acrylate, and 13.5 g of methyl acrylate, was metered in over 120 minutes. 20 minutes after the start of the second emulsion feed, 54.0 g of 5.6% strength ammonium hydroxide solution were metered in over 120 minutes. After the end of the feed, 38.4 g of deionized water were added and the temperature was lowered to 80° C. At an internal temperature of 80° C., 30.0 g of acetone bisulfite (3.5% strength) and 13.0 g of tert-butyl hydroperoxide (10% strength) were metered in over 120 minutes. This was followed by the addition of 0.24 g of ammonia (25% strength) and 38.4 g of deionized water, and the experiment was cooled to room temperature. The dispersion had a solids content of 50%, a pH of 8.4, an overall glass transition temperature of −37° C., and a particle size of 184 nm.

Oxazoline-Containing Polymers (Dissolved Polymer B)
Polymer Additive B1:
Epocros® WS 700 (methoxypolyethylene glycol/2-isopropenyl-2-oxazoline copolymer), Commercially available oxazoline-containing copolymer, solids content 25% by weight, in solution in water, oxazoline content 4.5 mmol/gram solid, Mn: 20 000 g/mol, Mw: 40 000 g/mol.
Polymer Additive B2:
A 2 L reactor with anchor stirrer was filled with 420 g of deionized water, 308 g of isopropanol, and 5.6 g of 2,2'-azobis(2-methylbutyronitrile) and this mixture was heated to 70° C. under nitrogen. Then a mixture of 72.8 g of methyl methacrylate, 61.6 g of n-butyl acrylate, and 67.2 g of 2-isopropenyl-2-oxazoline and, in a separate feed, 44.8 g of 2-acrylamido-2-methylpropanesulfonic acid (sodium salt) (50% strength solution in water) were added over the course of 180 minutes. At the same time, over 210 minutes, a solution of 5.6 g of 2,2'-azobis(2-methylbutyronitrile) in 140 g of isopropanol was added. When the feeds were ended, polymerization was continued at 75° C. for 5 hours. The isopropanol was subsequently distilled off under reduced pressure at 85° C. and water was added in an amount such as to achieve a solids content of 18%. The weight-averaged molecular weight of the polymer was 79 500 g/mol. The glass transition temperature of the polymer was 81° C.
Polymer Additive B3:
A 2 L reactor with anchor stirrer was filled with 420 g of deionized water, 308 g of isopropanol, and 5.6 g of 2,2'-azobis(2-methylbutyronitrile) and this mixture was heated to 70° C. under nitrogen. Then a mixture of 67.2 g of methyl acrylate, 67.2 g of n-butyl acrylate, and 67.2 g of 2-isopropenyl-2-oxazoline and, in a separate feed, 44.8 g of 2-acrylamido-2-methylpropanesulfonic acid (sodium salt) (50% strength solution in water) were added over the course of 180 minutes. At the same time, over 210 minutes, a solution of 5.6 g of 2,2'-azobis(2-methylbutyronitrile) in 140 g of isopropanol was added. When the feeds were ended, polymerization was continued at 75° C. for 5 hours. The isopropanol was subsequently distilled off under reduced pressure at 85° C. and water was added in an amount such as to achieve a solids content of 24%. The weight-averaged molecular weight of the polymer was 146 000 g/mol. The glass transition temperature of the polymer was 36° C.
Polymer Additive B4:
A 2 L reactor with anchor stirrer was filled with 420 g of deionized water, 308 g of isopropanol, and 5.6 g of 2,2'-azobis(2-methylbutyronitrile) and this mixture was heated to 70° C. under nitrogen. Then a mixture of 134.4 g of n-butyl acrylate, and 67.2 g of 2-isopropenyl-2-oxazoline and, in a separate feed, 44.8 g of 2-acrylamido-2-methylpropanesulfonic acid (sodium salt) (50% strength solution in water) were added over the course of 180 minutes. At the same time, over 210 minutes, a solution of 5.6 g of 2,2'-azobis(2-methylbutyronitrile) in 140 g of isopropanol was added. When the feeds were ended, polymerization was continued at 75° C. for 5 hours. The isopropanol was subsequently distilled off under reduced pressure at 85° C. and water was added in an amount such as to achieve a solids content of 20%. The weight-averaged molecular weight of the polymer was 114 000 g/mol. The glass transition temperature of the polymer was 6° C.

Polymer Additive B5:

In a reactor with anchor stirrer, 1512.0 g of deionized water and 18.0 g of 2,2'-azobis(2-methylpropionamidine) dihydrochloride were heated to 70° C. under nitrogen. Then a mixture of 90.0 g of n-butyl acrylate, 90 g of methyl methacrylate, 108.0 g of 2-isopropenyl-2-oxazoline, and 72 g of methoxypolyethylene glycol 550 methacrylate (Bisomer® MPEG 550, GEO Specialty Chemicals) was added over the course of 120 minutes. After the end of the monomer feeds, polymerization was continued at 60° C. for 9 hours. The number-averaged molecular weight of the polymer was 16 300 g/mol.

Comparative Example

Polymer Additive B6: Water-Insoluble Polymer Comprising Oxazoline Groups

In a 2 L reactor with anchor stirrer, 200 g of isopropanol were heated to 70° C. under nitrogen. Then a mixture of 60 g of ethyl acrylate, 80 g of methyl methacrylate and 60 g of 2-ilsopropenyl-2-oxazoline and, in a separate feed, 10 g of 2,2'-azobis(2-methylbutyronitrile) in 90 g of isopropanol were added over the course of 180 minutes. When the feeds ended, polymerization was continued at 75° C. for 5 hours. The weight-averaged molecular weight of the polymer was 53 100 g/mol. The glass transition temperature of the polymer was 76° C.

The polymer could not be formulated stably in an aqueous dispersion, since it precipitates when water is added.

Formulations:

The dispersions of examples A1 to A5 were blended with the oxazoline-containing polymer additives B1 to B5 in the proportions as indicated in table 1. Polymer additive B6 was not stably miscible in aqueous dispersion.

Production of Composite Films:

The blended polymer dispersions are knife-coated in a dry film thickness of 2 g/m$^2$ (based on the solids content) onto commercial films (OPP-ink; printed oriented polypropylene). After hot-air drying, the films thus coated are rolled up with a second film (metalized cast PP) and then pressed under a pressure of 6.5 bar and at 70° C. in a roller press at 5 m/min. The composite films are subsequently stored for 1 day at room temperature under standard conditions.

Determination of Peel Strength (Instantaneous Adhesion and Heat Stability):

For the determination of the peel strength, the composite films are cut up into strips 15 mm wide. The strips are then peeled at an angle of 2×90°) (180° and at a speed of 100 mm/min at 23° C. in a universal testing machine for peel strengths, from Zwick (model 1120.25.01), and the force required to achieve this is recorded, in newtons. To determine the instantaneous adhesion, the peel strength was recorded after 1 minute at 23° C. (immediate peel strength). To determine the heat stability, the peel strength was recorded at 90° C. in a heated chamber. In order to describe the chemical resistance of the adhesives, the laminates were stored in tomato ketchup at 50° C. for 7 days, after which their peel strengths were determined at 23° C.

The "24 h peel strength" is the peel strength determined 24 hours after production of the laminates, at room temperature (23° C.).

The results are compiled in Table 1.

TABLE 1

Test results, peel strength of laminating films

| Polymer A | Polymer B | Weight ratio A/B (solid/solid) | 24 h peel strength [N/15 mm] | 90° C. peel strength [N/15 mm] | 7 d/50° C. peel strength in ketchup [N/15 mm] |
|---|---|---|---|---|---|
| A1[1)] | — | | 0.6 | 0.9 | <0.1 |
| A1[1)] | B1 | 25/1 | 1.0 | 0.9 | 3.0 (MF) |
| A1[1)] | B5 | 14/1 | 0.7 | 0.8 | 3.3 (MF) |
| A2 | — | — | 1.8 | 0.3 | 1.0 |
| A2 | B1 | 20/1 | 2.6 | 0.3 | 3.9 (MF) |
| A3 | — | | 1.1 | 0.2 | 1.1 |
| A3 | B2 | 12/1 | 2.7 | 0.3 | 2.8 |
| A3 | B2 | 24/1 | 3.4 | 0.5 | 2.4 |
| A3 | B3 | 24/1 | 3.5 | 0.4 | 3.1 |
| A3 | B4 | 24/1 | 3.2 | 0.5 | 3.1 |
| A5[1)] | — | | 1.6 | 0.2 | 1.3 |
| A5[1)] | B2 | 24/1 | 2.8 | 0.2 | 2.7 |
| A5[1)] | B3 | 24/1 | 2.8 | 0.2 | 2.5 |
| A5[1)] | B4 | 24/1 | 2.5 | 0.3 | 2.6 |

[1)]Comparative; (MF) Fracture in the material of the laminated films

TABLE 2

Test results, peel strength of laminating films:

| Polymer A | Polymer B | Weight ratio A/B (solid/solid) | Immediate peel strength [N/15 mm] | 24 h peel strength [N/15 mm] |
|---|---|---|---|---|
| A2 | B1 | 20/1 | 2.0 | 2.6 |
| A4[1)] | B1 | 20/1 | 1.2 | 1.9 |

[1)]Comparative

The examples with inventively combined polymers A and B exhibit a significantly increased peel strength in comparison to the pure dispersions. The blends of comparative example A1 with a glass transition temperature Tg for the polymer A of greater than 0° C. show that with a high Tg, only relatively low peel strengths are obtained after 24 hours. The peel strengths after ketchup storage can be increased significantly by addition of oxazoline.

The blends of comparative example A5 (with 1 pphm emulsifier) and the figures in table 2 show the adverse effect of emulsifiers on the immediate peel strength and on the peel strength after 24 hours.

The invention claimed is:

1. An aqueous polymer dispersion for composite film lamination, the aqueous polymer dispersion comprising:
   (A) at least one dispersed polymer A prepared by radical emulsion polymerization,
      where initially in a first stage in aqueous medium a first polymer dispersed in water is prepared by radical emulsion polymerization, the first polymer being prepared from a first composition comprising ethylenically unsaturated radically polymerizable monomers, where the monomers of the first stage comprise at least one monomer having at least one acid group in an amount of at least 0.1 part by weight, based on 100 parts by weight of a total amount of monomers of the first stage and a second stage, and
      subsequently in the second stage a polymer dispersion is prepared in aqueous medium and in the presence of the first polymer by radical emulsion polymerization of a second composition comprising ethylenically unsaturated, radically polymerizable monomers, different from monomers of the first composition,
      where in total less than 0.5 part by weight of emulsifier, based on 100 parts by weight of monomers of the polymer A, or no emulsifier is used, and
      where a glass transition temperature of the polymer A prepared is less than 0° C.; and
   (B) at least one polymer B, in solution in the aqueous polymer dispersion and prepared by radical polymerization of
      (b1) at least one ethylenically unsaturated, radically polymerizable monomer having at least one oxazoline group, and
      (b2) at least 5% by weight, based on a total monomer amount of the polymer B, of at least one hydrophilic, ethylenically unsaturated, radically polymerizable monomer without oxazoline group and with a water solubility of at least 100 g/l at 25° C., and
      (b3) optionally further monomers (b3),
   wherein:
      the at least one hydrophilic, ethylenically unsaturated, radically polymerizable monomer (b2) includes at least one monomer comprising a sulfonic acid group; and
      the aqueous polymer dispersion is in the form of a one-component composition without additional cross-linking agents.

2. The polymer dispersion according to claim 1, wherein the polymerization of the first stage takes place at a pH of less than 5, and before or during the polymerization of the second stage, the acid groups of the first polymer are neutralized with aqueous ammonia solution to an extent such that the pH of the polymer dispersion at the end of the second stage is greater than 5.

3. The polymer dispersion according to claim 1, wherein the monomers (b1) comprising oxazoline groups are used in the polymer (B) in an amount of 10 to 60 parts by weight per 100 parts by weight of monomers of the polymer (B).

4. The polymer dispersion according to claim 1, wherein the monomer comprising oxazoline groups is a compound of the formula:

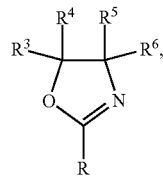

wherein: R is a $C_{2-20}$ alkenyl radical comprising at least one ethylenically unsaturated group;
$R^3$, $R^4$, $R^5$, and $R^6$ are independently of one another H, halogen, $C_{1-20}$ alkyl, $C_{2-20}$ alkenyl, $C_{6-20}$ aryl, $C_{7-32}$ arylalkyl, $C_{1-20}$ hydroxyalkyl, $C_{1-20}$ aminoalkyl, or $C_{1-20}$ haloalkyl.

5. The polymer dispersion according to claim 1, wherein the monomers comprising oxazoline groups are selected from the group consisting of 2-vinyl-2-oxazoline, 2-vinyl-4-methyl-2-oxazoline, 2-vinyl-5-methyl-2-oxazoline, 2-vinyl-4-ethyl-2-oxazoline, 2-vinyl-4,4-dimethyl-2-oxazoline, 2-vinyl-5,5-dimethyl-2-oxazoline, 2-vinyl-4,4,5,5-tetramethyl-2-oxazoline, 2-isopropenyl-2-oxazoline, 2-isopropenyl-4-methyl-2-oxazoline, 2-isopropenyl-5-methyl-2-oxazoline, 2-isopropenyl-4-ethyl-2-oxazoline, 2-isopropenyl-5-ethyl-2-oxazoline, 2-isopropenyl-4,4-dimethyl-2-oxazoline, 2-isopropenyl-5,5-dimethyl-2-oxazoline, 2-isopropenyl-4,4,5,5-tetramethyl-2-oxazoline, and mixtures thereof.

6. The polymer dispersion according to claim 1, wherein, in the first stage, monomers containing acid groups are copolymerized with monomers without acid groups, such that a weight ratio of the monomers containing acid groups to the monomers without acid groups ranges from 1:99 to 20:80.

7. The polymer dispersion according to claim 1, wherein:
   the monomers with at least one acid group that are used in the first stage are selected from the group consisting of acrylic acid, methacrylic acid, itaconic acid, maleic acid, fumaric acid, crotonic acid, vinylacetic acid, vinyllactic acid, and mixtures of these monomers; and
   the monomers without acid group that are used in the first stage are selected from the group consisting of a C1 to C10 alkyl acrylate and a C1 to C10 alkyl methacrylate, and mixtures of these monomers.

8. The polymer dispersion according to claim 1, wherein at least 60% by weight of the monomers used in the second stage are selected from the group consisting of a C1 to C20 alkyl acrylate, a C1 to C20 alkyl methacrylate, a vinyl ester of a carboxylic acid comprising up to 20 C atoms, a vinylaromatic having up to 20 C atoms, an ethylenically unsaturated nitrile, a vinyl halide, a vinyl ether of an alcohol comprising 1 to 10 C atoms, an aliphatic hydrocarbon having 2 to 8 C atoms and one or two double bonds, and mixtures of these monomers.

9. The polymer dispersion according to claim 1, wherein the polymers of the first and second stages are polymers which apart from the acid monomers are formed exclusively of derivatives of (meth)acrylic acid.

10. The polymer dispersion according to claim 1, wherein a chain transfer agent is used in the polymerization of the first stage.

11. The polymer dispersion according to claim 1, wherein a weight ratio of an amount of the monomers used in the first stage to an amount of the monomers used in the second stage is from 5:95 to 50:50.

12. The polymer dispersion according to claim 1, wherein the polymerization of the first stage takes place in the presence of a seed latex.

13. The polymer dispersion according to claim 1, wherein the monomers used in the second stage comprise not more than 1 part by weight of monomers with acid groups, based on 100 parts by weight of monomers of the polymer (A), or comprise no monomers with acid groups.

14. The polymer dispersion according to claim 1, wherein a molar ratio of acid groups in the polymer A to oxazoline groups in the polymer B is from 20:1 to 1:1.

15. The polymer dispersion according to claim 1, wherein a weight ratio of polymer A to polymer B is from 5:1 to 50:1.

16. The polymer dispersion according to claim 1, wherein the monomer (b2) is selected from the group consisting of a salt of an ethylenically unsaturated sulfonic acid, acrylamide, methacrylamide, an ester of an unsaturated carboxylic acid with a polyethylene glycol, an ester of an unsaturated carboxylic acid with an alkylpolyethylene glycol, and mixtures of these monomers.

17. A laminating adhesive, comprising the aqueous polymer dispersion of claim 1.

18. A composite film, comprising a first film and at least one second film, which are bonded to one another using an adhesive comprising the aqueous polymer dispersion of claim 1.

19. A process for producing a composite film, the process comprising bonding at least two films with one another using the aqueous polymer dispersion of claim 1.

20. A process for preparing an aqueous polymer dispersion for composite film lamination, the process comprising preparing a polymer (A) dispersed in aqueous phase by radical emulsion polymerization,
where initially in a first stage in aqueous medium a first polymer dispersed in water is prepared by radical emulsion polymerization, the first polymer being prepared from a first composition comprising ethylenically unsaturated radically polymerizable monomers, where the monomers of the first stage comprise at least one monomer having at least one acid group in an amount of at least 0.1 part by weight, based on 100 parts by weight of a total amount of monomers of the first stage and a second stage, and
subsequently in the second stage a polymer dispersion is prepared in aqueous medium and in the presence of the first polymer by radical emulsion polymerization of a second composition comprising ethylenically unsaturated, radically polymerizable monomers, different from monomers of the first composition,
where in total less than 0.5 part by weight of emulsifier, based on 100 parts by weight of monomers of the polymer (A), or no emulsifier is used, and
where a glass transition temperature of the polymer (A) prepared is less than 0° C.; and
where the dispersed polymer (A) is mixed with a polymer (B) soluble in the polymer dispersion, the polymer (B) being prepared by radical polymerization of
(b1) at least one ethylenically unsaturated, radically polymerizable monomer having at least one oxazoline group, and
(b2) at least 5% by weight, based on a total monomer amount of the polymer B, of at least one hydrophilic, ethylenically unsaturated, radically polymerizable monomer without oxazoline group and with a water solubility of at least 100 g/l at 25° C., and
(b3) optionally further monomers (b3),
wherein:
the at least one hydrophilic, ethylenically unsaturated, radically polymerizable monomer (b2) includes at least one monomer comprising a sulfonic acid group; and
the aqueous polymer dispersion is in the form of a one-component composition without additional cross-linking agents.

* * * * *

UNITED STATES PATENT AND TRADEMARK OFFICE
CERTIFICATE OF CORRECTION

PATENT NO. : 10,604,685 B2
APPLICATION NO. : 15/565433
DATED : March 31, 2020
INVENTOR(S) : Matthias Zorn et al.

It is certified that error appears in the above-identified patent and that said Letters Patent is hereby corrected as shown below:

In the Specification

In Column 6, Line 8, "1000, g/mol." should read -- 1000 g/mol. --

In Column 7, Line 39, "Encycloädie" should read -- Enzyklopädie --

In Column 9, Line 59, delete "d50" and insert -- $d_{50}$ --, therefor

In Column 13, Line 33 (approx.), "vinylimidazolinium" should read -- vinylimidazolium --

In Column 13, Line 34 (approx.), "vinylimidazolinium" should read -- vinylimidazolium --

In Column 16, Line 3, "$SO_3$ M" should read -- $SO_3M$ --

In Column 16, Line 7, "C1_10" should read -- $C_{1-10}$ --

In Column 16, Line 14, "$CH_2$;" should read -- $CH_2$-; --

In Column 16, Line 14, "$CH_2$;" should read -- $CH_2$-; --

In Column 17, Line 13, "SO3H" should read -- $SO_3H$ --

In Column 20, Line 44, "tertbutyl" should read -- *tert*-butyl --

In Column 21, Line 44, "tertbutyl" should read -- *tert*-butyl --

Signed and Sealed this
Eighteenth Day of August, 2020

Andrei Iancu
*Director of the United States Patent and Trademark Office*